April 9, 1963 W. G. BROSENE, JR 3,084,728
TIRE CHANGING DEVICE
Filed Dec. 12, 1960 5 Sheets-Sheet 1

INVENTOR.
WILLIAM G. BROSENE, JR.
BY
J Warren Kinney Jr.
ATTORNEY

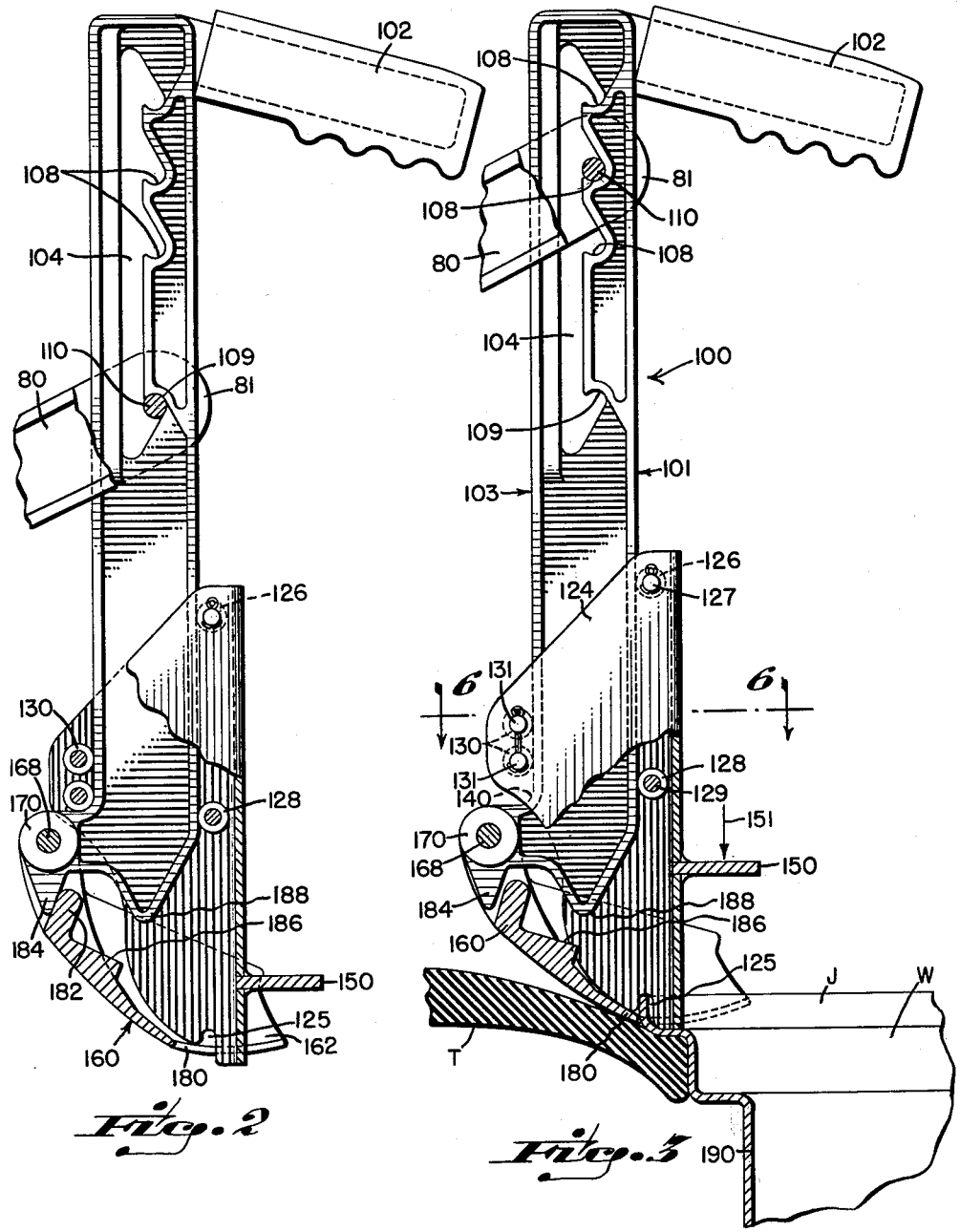

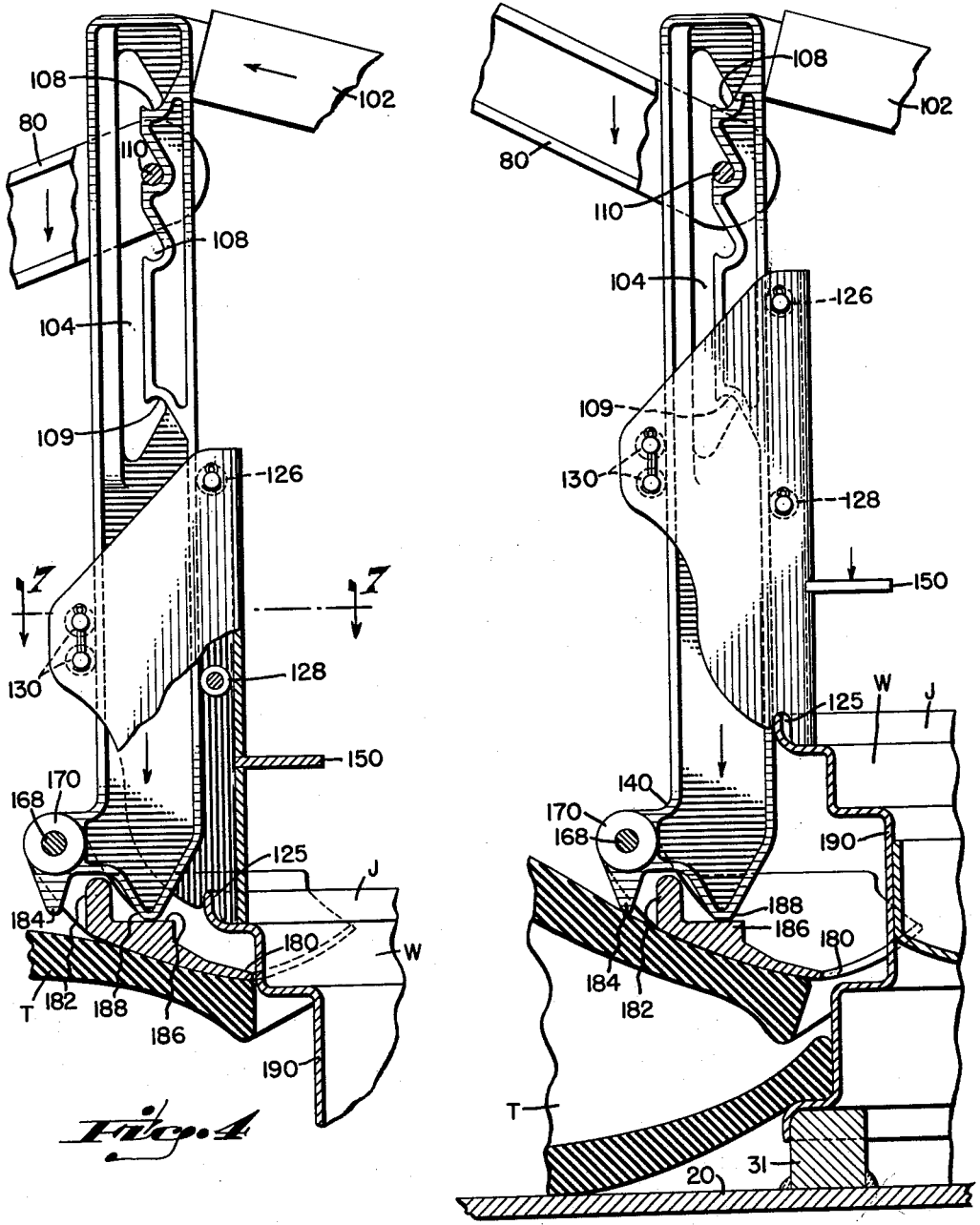

April 9, 1963  W. G. BROSENE, JR  3,084,728
TIRE CHANGING DEVICE

Filed Dec. 12, 1960  5 Sheets-Sheet 4

INVENTOR.
WILLIAM G. BROSENE, JR.
BY
J. Warren Kinney, Jr.
ATTORNEY

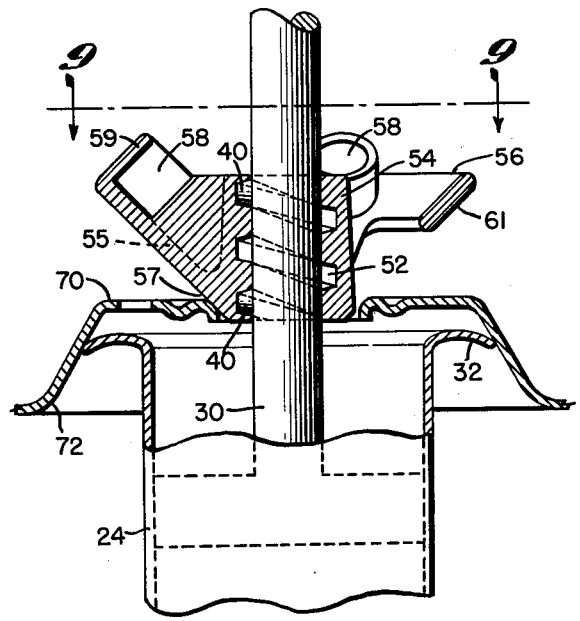
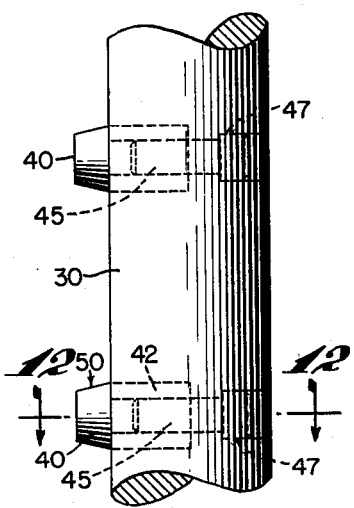
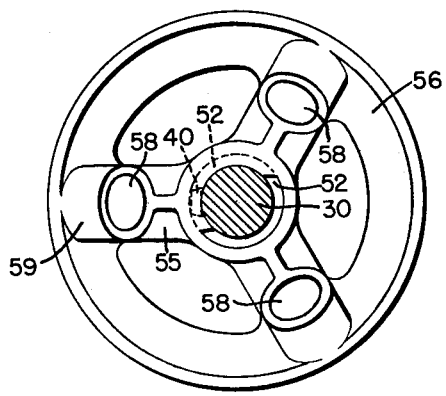
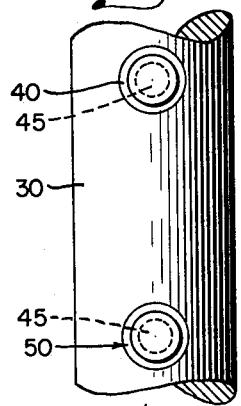
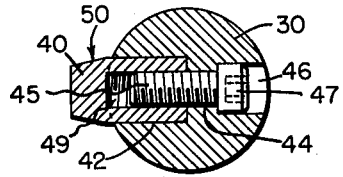

United States Patent Office 3,084,728
Patented Apr. 9, 1963

3,084,728
TIRE CHANGING DEVICE
William G. Brosene, Jr., Wyoming, Ohio, assignor to Big Four Industries, Inc., Maineville, Ohio, a corporation of Ohio
Filed Dec. 12, 1960, Ser. No. 75,345
3 Claims. (Cl. 144—288)

This invention relates to a tire changer, and more particularly to a device for loosening the bead of a pneumatic tire casing from its rim-seat and moving said bead into the drop-centerwell of the rim.

An object of the invention is to provide a tire changer having a bead-breaking jaw which is adapted to apply a bead-unseating force to the upper side wall of a tire and rim assembly disposed upon a supporting ground-level surface.

A further object of the invention is to provide an improved jaw for effectively and expeditiously dislodging the bead of a tire from its rim seat without damage to the side walls of a tire or the beads thereof.

Still another object of the invention is to provide a tire changer which includes a vertical pedestal or standard having a rim-supporting surface at the upper end thereof, which device includes a simple yet highly effective means for expeditiously centering and locking a wheel thereon.

Still another object of the invention is to provide a tire changer which includes a ground-engaging flat supporting base to which a vertical support column is rigidly secured for providing a pedestal or support member for a wheel mounted above and in spaced parallelism with said base, and which support column comprises the fulcrum for a lever which extends diametrically therethrough, and to one end of which lever a power cylinder is connected for elevating that end of the lever while lowering the opposite end of the lever, which opposite end carries a bead-breaking jaw supporting structure.

These and other objects are attained by the means described herein and disclosed in the accompanying drawings, in which:

FIG. 2 is an enlarged side view, partly in section, of the jaw and jaw support comprising a detail of the invention.

FIG. 3 is a view similar to FIG. 2, illustrating the relationship of the parts thereof when associated with the outer periphery of a wheel having a tire associated therewith.

FIGS. 4 and 5 are views similar to FIG. 3, illustrating the sequential operational steps of the jaw and jaw support in breaking the bead of the tire from the wheel seat and of then shifting said bead into the drop-center of the wheel.

FIG. 8 is an enlarged view partly in section, illustrating the structural details of the upper end of the support, the center column, and locking cone.

FIG. 9 is a view taken on line 9—9 of FIG. 8.

FIG. 10 is an enlarged view illustrating a detail of the invention.

FIG. 11 is a view of the left side of FIG. 10.

FIG. 12 is a sectional view taken on line 12—12 of FIG. 10.

Figure 1:
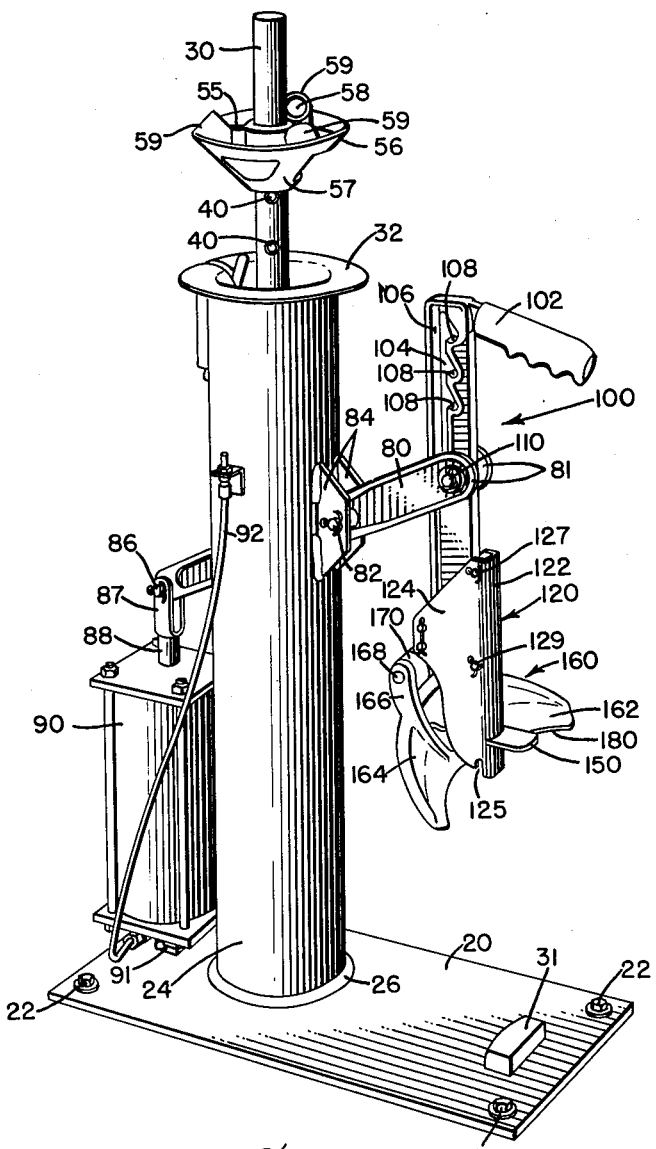
FIG. 1 is a perspective view of a tire changer embodying the teachings of the present invention.
Figure 6:
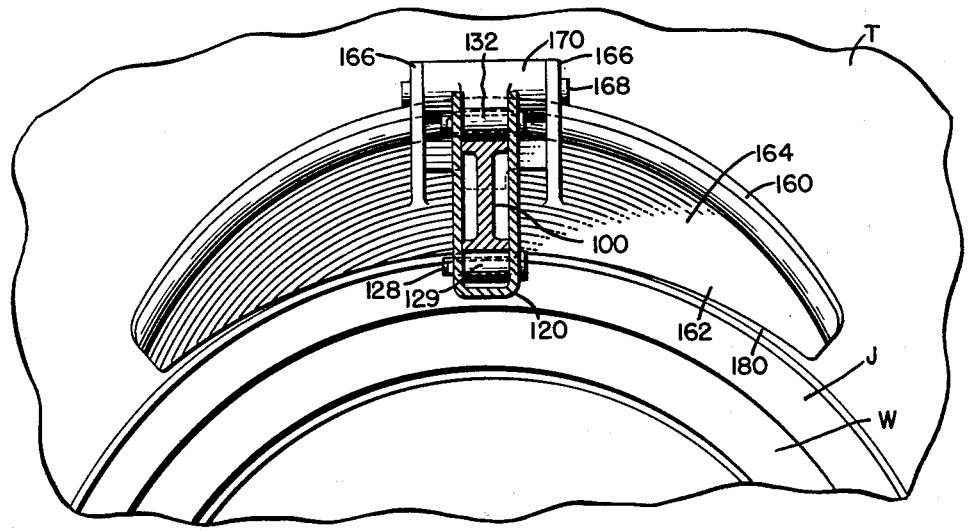
FIG. 6 is a view taken on line 6—6 of FIG. 3.
Figure 7:
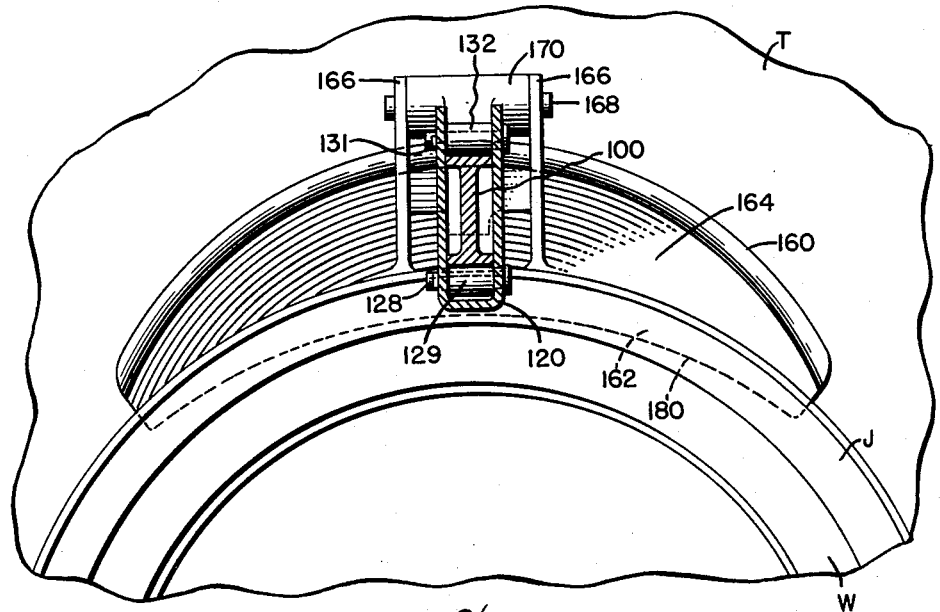
FIG. 7 is a view taken on line 7—7 of FIG. 4.

With reference to the drawings, the numeral 20 denotes generally a base or support plate which may be securely though releasably affixed to a supporting surface, such as the floor of a garage, or the like, by means of lag bolts 22 or the like. An elongate pedestal or standard 24 is rigidly secured to and carried by base 20 such as by means of welding as at 26, or the like. A rigid center post 30 is fixedly secured relative to the upper portion of pedestal or standard 24 whereby to project axially from the upper end of the standard, as best illustrated in FIG. 1. The present invention is neither concerned with nor directed to the particular structural details utilized for rigidly fixing center post 30 relative to the standard or pedestal.

In the preferred embodiment of the invention, the upper end of the standard may be flared outwardly or provided with a substantially flat supporting surface 32 which is in spaced parallelism with the upper face of base 20.

At 31 is indicated a wheel rim positioner, which may be in the form of a rigid block upstanding upon the upper face of plate 20, at a distance from standard 24, the purpose of which is to preclude inadvertent shifting of the wheel in a direction away from the standard once the wheel rim has been placed between the block and the standard.

With particular reference now to FIGS. 10–12, it will be noted that center post 30 may be provided with a plurality of laterally extending tooth-forming plugs or lugs 40 which are received within transverse sockets 42 disposed in axial alignment with transverse bores 44 and 46. Bores 46 are dimensioned to receive the head 47 of a bolt, the shank 45 of which extends through bore 44. Plug 40 is provided with an internally threaded bore 49, which is threadably engaged by shank 45 of the bolt whereby plug 40 may be securely though releasably anchored relative to center post 30. That portion of plug 40 which projects outwardly beyond the outer periphery of the center post is tapered whereby to provide a truncated conical portion 50, which is adapted to be received within the steeply pitched internal thread or spiral groove 52 of the central hub portion 54 of a rotatable combination locking and centering cone 56.

It will be noted that plugs 40 may be released by an operator, thereby permitting them to be selectively rotated about their axis, after which they may be again locked or fixedly secured to the center post 30, for thereby presenting a new and unworn tapered surface 50 for engagement with the threaded groove 52 of cone 56.

It will likewise be noted that the plugs may be easily removed and replaced with new or other plugs simply by loosening and removing stud 44.

As best illustrated in FIGS. 1, 8 and 9, the combination centering and locking cone includes an angular bearing surface 57, a rim 61, and a plurality of angularly directed sockets 58 in bosses 59 disposed radially with respect to threaded portion 52 thereof, whereby to provide means adapted to receive the end of an elongated rigid member such as a loosely fitting pipe or the like, by which an axial seating force may be applied to the cone incident to centering and locking the hub 70 of a wheel 72 relative to the upper end of standard 24. The cone is quickly rotatable and displaceable off the upper end of post 30.

With particular reference now to FIGS. 1–5, the numeral 80 denotes a lever arm which is pivotally secured as at 82 to standard 24 by means of a pair of laterally spaced wings 84 rigidly mounted to the face of said standard. It will be understood that suitable elongated openings are provided in the opposite sides of standard 24, for accommodating lever 80 which passes through the standard.

The rear end of said lever is connected as at 86 to a yoke 87 secured to and carried by the upper end of a piston rod 88 of the cylinder assembly denoted generally by the numeral 90. A source of fluid media may be introduced into the lower end of cylinder assembly 90 by means of conduit 92 whereby piston rod 88 will be advanced upwardly for thereby raising the rear end of lever 80. Return of the piston rod to normal lowered position may be effected by spring pressure or other known expedient.

The cylinder assembly 90 is secured to and carried by base 20, using any suitable means not necessarily relevant to the present disclosure, but preferably in the form of a hinge 91 for facilitating pivotal movement of the lower end of the cylinder assembly 90 relative to plate 20 incident to extension and retraction of piston rod 88.

The forward end of lever 80 may be bifurcated whereby to provide a pair of laterally spaced, substantially parallel ears 81 carrying a transverse pivot pin 110.

The numeral 100 denotes generally an elongate ratchet bar or pressing bar the upper end of which terminates in a fixed handle 102.

The ratchet or pressing bar may include an open vertical track or passageway 104 having a substantially flat uni-planar rear face 106, and a forward face which is provided with series of notches 108, any of which is adapted to receive the lever pin 110 which is secured to, carried by and spans the forward bifurcated ear portion 81 of lever 80. Bar 100 may be rocked upon pin 110 by means of handle 102.

The numeral 120 denotes a slide housing which comprises a front wall 122 and a pair of laterally spaced side walls 124 which are adapted to receive and slidably support the ratchet bar 100. In the preferred embodiment of the invention, and as best illustrated in FIGS. 2–5, anti-friction roller members 126 and 128 are rotatably mounted upon shafts 127 and 129, respectively, the opposite ends of which shafts are secured to and carried by the laterally spaced side walls 124 of the slide. These rollers 126 and 128, located between side walls 124, engage the forward face 101 of the ratchet or pressing bar. Anti-friction rollers 130 are similarly mounted on shafts 131 whereby to engage the rear axial face 103 of bar 100.

From the foregoing, it will be noted that the slide housing and ratchet bar are thus mounted for relative endwise axial movement. As best illustrated in FIGS. 3, 4 and 5, the lower rearward end of ratchet bar 100 is outturned to provide a seat 140 which is engageable by the lowermost of the rear rollers 130 for precluding accidental or unintentional disengagement of the slide from the ratchet bar, and for determining the lowermost position which the slide will assume on the bar, note FIG. 2.

The forward face of the slide is provided with a toe plate 150 for a purpose which will be more fully explained.

A bead-breaking jaw 160 (FIG. 1) includes a tire-engaging marginal toe portion 162, an intermediate heel portion 164, and a pair of laterally spaced arms 166 which are pivotally mounted as at 168 upon the offset boss 170 of the ratchet or pressing bar 100.

The lower ends of the side walls 124 of the slide housing are notched as at 125, whereby to receive the peripheral edge J of a wheel rim W. Notches 125 serve as a positioning means for locating the rim and the bead of the mounted tire with relation to jaw 160.

With reference now to FIGS. 3, 4 and 5, it will be noted that jaw 160 is to be initially associated with the bead-adjacent portion of the tire casing T by first locating the slide housing with the wheel periphery J seated within notches 125 of the slide. This step is facilitated by application of a downward force such as by the weight of a man stepping on toe plate 150 for applying a force in the direction indicated by the headed arrow 151. As illustrated in FIG. 3, when peripheral edge J of the wheel W has thus been received within notches 125 of the slide 120, the forward edge 180 of jaw 160 will overlie the casing adjacent to rim edge J.

When fluid media is thereafter introduced into the lower end of the cylinder assembly 90, the forward end 81 of lever 80 will be forced downwardly, whereupon lever pin 110 will apply a lowering force to ratchet or pressing bar 100 by way of a notch 108.

It will be understood that pin 110 will enter or engage one or another of the notches or ratchet teeth 108, depending upon the width of the tire undergoing demounting. That is, the jaw 160 will engage the side wall of a large tire at a relatively high elevation above plate 20, which may result in pin 110 engaging the lowermost one of the notches or teeth 108. In the case of a smaller or more narrow tire, the bar 100 will drop to a lower elevation, at which the pin may engage the uppermost or perhaps the second notch or tooth 108 of the bar 100.

As will be understood, the number of notches or teeth 108 provided in bar 100 may be increased or decreased if desired, depending upon the range of tire sizes the equipment is expected to handle. It may be noted that the terminal notch or tooth 109 is reversed in comparison with the others, so that it may normally perform to suspend the pressing bar well above any tire placed upon the base plate 20. In using the device, the operator, by means of handle 102, will lift the pressing bar from pin 110, before lowering it toward the tire to be demounted from its wheel rim.

With reference to FIGS. 2 and 3, it should be noted that jaw 160 by reason of its pivot 168 being offset relative to the axis of pressing bar 100, has rocking movement principally in the direction of extension of the bar axis. Downward movement of the jaw is limited, as by means of a stop lug 182 thereof engaging a stationary lug or abutment 184 depending from boss 170 of the pressing bar.

In the upward direction, jaw 160 may be limited in its travel by means of a pad or abutment 186, extending upwardly from its concave upper face, and adapted to strike the terminal lower end 188 of the pressing bar or ratchet bar 100 as the jaw is rocked upwardly about its pivot 168 (see FIGS. 4 and 5).

From the foregoing, it will be evident that the jaw 160 normally hangs as in FIG. 2, with abutments 182 and 184 in contact with one another to limit the downward swing of the jaw. When slide 120 is pressed downwardly, as by means of toe plate 150, the notch or positioning means 125 of slide 120 will engage the peripheral edge J of the wheel rim to hold the latter against lateral shifting, while at the same time the free edge portion 180 of the jaw will press upon the side wall of the tire near the rim edge J, initially, as in FIG. 3.

Thereafter, as downward force is applied to the pressing bar by the action of fluid cylinder 90, the parts will assume the relative positions of FIG. 4, wherein the free edge 180 of the jaw has entered between the rim portion J and the bead of the tire, to depress the bead toward the drop center 190 of the rim. Here note that swinging movement of the jaw has been arrested by reason of pad 186 striking the terminal end 188 of the pressing bar, so that further movement of the jaw and its toe or free edge portion 180 is linear, in agreement with advancement of the pressing bar.

As downward advancement of the pressing bar continues, the tire bead will deform rather markedly, as in FIG. 5, to sufficiently and certainly break the bead away from the rim seat and dispose it into register with the drop center of the rim. The performance may be repeated as often as necessary at different portions of the rim, to fully release the tire bead from the rim. After one bead has been fully released, the tire may be turned over and subjected to similar treatment for release of the remaining bead thereof.

From the foregoing explanation, it will be understood that jaw 160 performs in two steps or phases. In the first, or initial phase, the jaw descends to contact the tire side wall close to rim edge J, and then pivots about pin 168 to drive the free edge 180 of the jaw between the rim edge and the adjacent bead of the tire, FIGS. 3 and 4. The free edge of the jaw preferably is advanced radially of the wheel no farther than the inner diametral dimension of the bead, this advancement being restrained or limited by contact of pad 186 upon the terminal end 188 of the pressing or ratchet bar. During the second phase, further advancement of the jaw is purely linear across the drop center of the wheel rim, so that the jaw edge 180 accordingly will not follow the contour of the rim, but will rather move in parallelism with the direction of advancement of the pressing bar 100. This phase of the jaw movement is indicated clearly upon FIG. 5, wherein it may be noted that the free edge portion 180 of the jaw remains outside the confines of the drop center of the wheel rim.

After breaking of the bead from the rim, as in FIG. 5, pressure of fluid in cylinder 90 may be relieved, causing the pressing bar 100 to withdraw from the tire. In the course of withdrawal, jaw 160 will drop about its hinge 168 to the limit indicated upon FIG. 2, at which position the jaw edge is automatically retracted from the rim edge J and from proximity with positioning notch 125. Such action of the jaw and pressing bar immediately and without conscious effort relieves all force and any binding restraint from the parts, to facilitate and expedite disposition of the pressing bar and jaw to the initial elevated position of FIG. 1 in readiness for a subsequent bead-breaking operation.

The device of the invention is simple and inexpensive to manufacture, and possesses greater durability and reliability in service than may be expected from presently available apparatus usually of a more complex nature. The bead-breaking procedure is performed rapidly and without the need for skilled labor. The parts of the apparatus are few in number and sturdy of construction, so that little if any maintenance is required.

So far as the wheel clamping feature of the apparatus is concerned, the plugs or studs 40 on post 30 will remain serviceable for a long period of time due to the adjustability thereof for wear as previously mentioned. Wearing of the plugs, and of the severely pitched internal threads 52 of the locking and centering cone 56, may, of course, be minimized by resorting to occasional lubrication thereof; however, should such parts require replacement at any time, the cost is practically negligible. The cone 56 may be simply a metallic casting requiring no machining necessarily, and the plugs may be simple and inexpensive castings, or turned metallic parts easily produced by automatic machinery at low cost. With further reference to plugs 40, these, if desired, may be rendered freely rotatable for frictionless performance, by simply loosening the screws 45 or otherwise altering the mountings for the plugs.

The foregoing and other changes or modifications in structural details of the device may be made, within the scope of the appended claims, without departing from the spirit of the invention.

What is claimed is:

1. In a device for servicing beaded pneumatic tires mounted upon a wheel, the combination of a pedestal having an upper end provided with an area for supporting a wheel in transverse relationship to the pedestal axis, a rigid center post projecting from the pedestal above the wheel-supporting area thereof, and a combination wheel centering and locking element rotationally surrounding said post, said element including an internally threaded bore in which the post is received, and at least one extending plug projecting laterally from the post to engage the internal thread of the wheel centering and rocking element and thereby induce axial shifting of said element incidental to rotation thereof, and means for adjusting the plug relative to the post, for presenting different areas of the plug to said thread in compensating for wear of the plug, wherein the plug is in the form of a short cylinder having an exposed end and an opposite end, the post being bored transversely to receive rotationally said opposite end of the plug, and the adjusting means includes means for fixing the plug to the post in selected rotated positions of the plug within said bore.

2. A wheel centering and locking element for clamping a wheel hub upon a support, said element comprising a frusto-conical body including a central hub bored and internally threaded axially of the body, a circumferential rim, and a plurality of arms radiating from the central hub and connecting the rim thereto, said arms each carrying a boss provided with a socket having an axis which when extended intersects the axis of the internally threaded hub at a point outwardly beyond the larger end of the frusto-conical body.

3. A wheel centering and locking element for clamping a wheel hub upon a support, said element comprising a frusto-conical body including a central hub bored and internally threaded axially of the body, a plurality of hollow bosses on the body providing a plurality of sockets each having an open end, the open ends of the sockets being directed toward the axis of the central hub bore outside the confines of the frusto-conical body, wherein the axes of the several sockets meet at a point which is closer to the larger end than to the smaller end of the frusto-conical body.

References Cited in the file of this patent

UNITED STATES PATENTS

| 28,613 | Spencer | June 5, 1860 |
| 1,806,947 | Mjelva | May 26, 1931 |
| 2,406,996 | Colley | Sept. 3, 1946 |
| 2,513,756 | Smyser | July 4, 1950 |
| 2,548,033 | Madden | Apr. 10, 1951 |
| 2,652,078 | Rockwell | Sept. 15, 1953 |
| 2,667,212 | Zaffina | Jan. 26, 1954 |
| 2,720,915 | Lenoir | Oct. 18, 1955 |
| 2,738,002 | King | Mar. 13, 1956 |
| 2,749,975 | Curtis | June 12, 1956 |
| 2,895,519 | Coats | July 21, 1959 |
| 2,916,065 | Duquesne | Dec. 8, 1959 |
| 2,956,620 | Schwarz | Oct. 18, 1960 |
| 2,962,065 | Moore | Nov. 29, 1960 |